United States Patent [19]

Horembala

[11] 4,151,079
[45] Apr. 24, 1979

[54] REGENERATION OF ION EXCHANGE RESINS

[75] Inventor: Louis E. Horembala, Burlington, Canada

[73] Assignee: Nalco Chemical Company, Oak Brook, Ill.

[21] Appl. No.: 912,618

[22] Filed: Jun. 5, 1978

[51] Int. Cl.² .............................. B01J 1/08; C02B 1/76
[52] U.S. Cl. .................................. 210/32; 210/37 R; 210/38 A
[58] Field of Search ............... 210/30 R, 32, 33, 37 R, 210/38 A

[56] References Cited

U.S. PATENT DOCUMENTS

| | | | |
|---|---|---|---|
| 2,855,363 | 10/1958 | Kittredge | 210/30 R |
| 3,139,401 | 6/1964 | Hach | 210/38 A |
| 3,385,787 | 5/1968 | Crits et al. | 210/32 |
| 3,692,670 | 9/1972 | Burns et al. | 210/32 |
| 4,039,443 | 8/1977 | Tahara et al. | 210/32 |
| 4,116,860 | 9/1978 | Kunin | 210/32 X |

*Primary Examiner*—Thomas G. Wyse
*Attorney, Agent, or Firm*—John G. Premo; Robert A. Miller

[57] ABSTRACT

Problems encountered with sodium leakage after regeneration of mixed bed and ion exchange units utilized to purify boiler feed waters can be reduced or eliminated by using as the regenerant for the anion exchange resin an aqueous solution of potassium hydroxide. Likewise, in the regeneration of cation condensate polishing units utilized to purify boiler feed waters, sodium leakage can be reduced or eliminated by utilizing a potassium salt as the regenerant.

Additionally, potassium salts of various inorganic reducing agents can also be utilized to remove iron from ion exchange systems operated in the above manner.

7 Claims, No Drawings

REGENERATION OF ION EXCHANGE RESINS

INTRODUCTION

Over the last 15 years with increasing sophistication of industrial boilers, there has been an increased need to refine boiler feed water and condensate to extremely low levels of extraneous ions. This is necessary due to the fact that these ions can attack the metallic systems which are used to construct boilers, heat exchangers, piping and the like. A convenient method for treating condensate waters prior to their return to the boiler has been with the use of ion exchange techniques. This process is capable of preparing water containing less than 1 part per billion of sodium and processes of this type are extremely beneficial for use in utility power plants and the like due to the undesirable deposition and/or corrosive effects for turbine boiler and cycle components due to sodium salts.

Two types of ion exchange techniques are being used commercially and both treatments provide boiler feed water condensates having extremely low levels of sodium.

I. Mixed bed systems containing anion and cation exchange resins for the purification of water have many industrial applications. A primary application of such a system is in the purification of makeup and condensate water for use as boiler feed water. It is essential that this water be on an extremely high purity level for use in steam generation in order to avoid any coating on the surface of turbine blades, boilers, pipes, etc. It is conventional to regenerate the cation exchange resin with a strong acid such as sulfuric or hydrochloric acid, and to regenerate the anion exchange resin with a strong base, generally sodium hydroxide. In condensate systems, after regeneration, the cation exchange resin may optionally be converted to ammonium or amine form. This conversion may be accomplished by treatment with ammonium hydroxide or suitable amine subsequent to regeneration with acid. More preferably, the conversion to the ammonium or amine form simply takes place during operation of the steam-condensate system, in which ammonium hydroxide or amine is introduced into the water to prevent corrosion.

A particular problem with condensate mixed bed ion exchange systems of the type conventionally employed is the production of ion "leakage." This refers to any ions that are not removed from the water by the ion exchange resin, and thus are permitted to "leak" past the resin.

The leakage problem arises primarily from the impossibility of obtaining perfect separation of the anion and cation resins in the mixed bed prior to regeneration. As is familiar to those skilled in the art, such separation is conventionally accomplished by passing water through the resin in an upflow direction. This stream of water carries the less dense anion exchange resins to the top of the separation vessel, while the more dense cation exchange resin is permitted to sink to the bottom. While this method is effective in separating the bulk of the resins, perfect separation is not achieved. Furthermore, resin fines will be produced during use. The cation exchange resin fines will not sink to the bottom in the separation vessel, but will be carried upwardly with the anion exchange resin. When the anion exchange resin is subsequently regenerated with sodium hydroxide, sodium ions will be introduced into the ion exchange sites in the cation resin contaminant. When the resins are returned to the service column, these sodium ions will be exchanged into the water being treated, producing sodium leakage.

The source of sodium leakage which occurs is generally due to the entrainment of cation resins and fines in the anion layer discussed above. The entrained cation resin during regeneration is contacted with sodium hydroxide which converts the cation resin to the sodium form. This sodium is subsequently displaced by ammonium or amine ion normally present in the condensate during the next mixed bed operating cycle.

II. Another type of ion exchange technique which has gained acceptance is sodium cycle condensate polishing. In sodium cycle condensate polishing, a cation exchange resin is used in the sodium form and removes soluble ionized calcium, magnesium, iron, copper and other di and trivalent ions by typical ion exchange. Flow rates in a typical process of this type are on the order of 15 to 35 gallons per minute per square foot of bed area, at a temperature of between 140°-300° F., although flow rates and temperature vary with design of individual units. Regeneration of the ion exchange resin is normally carried out in place and consists of backwash with high pressure high temperature condensate followed by brine regeneration with approximately 15 pounds of sodium chloride per cubic foot of resin. Sodium cycle condensate polishers are often regenerated with a solution of sodium chloride with the simultaneous injection of a reducing agent such as sodium sulphite (catalyzed or uncatalyzed) and/or sodium hydrosulphite to minimize or reduce ferric ion formation during the regeneration step.

This type of system is particularly beneficial in pulp and paper mills because of possible raw water inleakage into the condensate system as well as the incidence of oxides of iron and copper. Condensate in industrial plants is often treated by corrosion inhibitors which may contain volatile amines. These amines include morpholine, methoxypropylamine, and/or cyclohexylamine. Oxygen scavengers such as hydrazine are also often employed in industrial boiler systems of this type. In addition, the condensate may also contain amonia.

The calcium and magnesium and soluble iron will displace sodium resulting in hardness reduction with some sodium salts going to the boiler. In addition, ammonia and some of the volatile amines may displace sodium resulting in the formation of some sodium bicarbonate which in turn converts to sodium hydroxide in the boiler water. It is the latter reaction that is receiving some attention now. Normally the ammonium and/or volatile amine in combination with carbon dioxide would result in volatile components. Any displacement by ammonia or amine of the sodium on the cation resin would result in a definite sodium compound which would end up as sodium hydroxide in the boiler. The presence of the additional sodium hydroxide leads to problems of control of boiler water chemical balance and also possible carryover of sodium.

There is increasing concern for the level of sodium present in these types of systems. Some new equipment specifications show maximum limits of sodium in the treatment condensate of 100 parts per billion or less. This equipment includes turbines, and other power generation equipment.

With the use of sodium cycle condensate polishing, some amine present in the water being exchanged will be exchanged for the sodium present on the resin. This sodium is then carried over into the treated water. Due to the selectivity of ion exchange resins, while amines will displace sodium, they will not displace potassium and, therefore, it would be an advantage to the art and is in fact the object of my invention, to use potassium salts in place of corresponding sodium salts when regenerating ion exchange systems of this type.

It is possible to operate a cation exchange polisher in ammonium or amine (e.g., morpholine, etc.) cycle. This involves regeneration with either sulphuric or hydrochloric acid to remove the calcium, magnesium, iron, etc. This is followed by an ammoniation cycle to convert the hydrogen form of the resin to the ammonium form or the amine form.

The ammonium cycle form has been used in some plants because of the potentially high ammonia content in the condensate. When sodium cycle condensate polishing was used, this resulted in displacement of sodium by ammonium with high alkalinities developing in the boiler water.

If there is raw water in leakage into a condensate system employing either ammonium or volatile amine as the cation, the calcium, magnesium and iron will displace the ammonium or amine. However, the raw water may contain some non-carbonate hardness due to chlorides, nitrates or sulphates of calcium and magnesium. The corresponding ammonium and amine salts would be volatilized in the boiler leaving behind sulphuric, nitric and hydrochloric acid.

It is expected that if the cation resin used for condensate polishing is in the potassium form, potassium would not be displaced by ammonium or amine during normal operating conditions. On the other hand, if there is a raw water leak there generally would be some potassium bicarbonate formation and subsequent potassium hydroxide in the boiler water, however, the chlorides, nitrates and sulphates would also be present as potassium salts.

Where resin is converted to the ammonium form and placed on the line at high temperatures there is a period of equilibrating with resultant massive loss of some of the ammonia on the resin. Thus, some of the resin may be in the hydrogen form. This could lead to some acidic condensate for a period of time after a unit is placed in service after regeneration.

One method which I have found to be particularly beneficial and would solve substantially all of the problems enumerated above, in both mixed bed systems and in both sodium cycle and amine cycle condensate polishing would be to substitute potassium salts, specifically potassium hydroxide for sodium hydroxide and potassium chloride for sodium chloride that is currently being used to regenerate the ion exchange resin. The displacement of cations on an ion exchange resin is a function of the selectivity of the cations. The selectivity of ion exchange resins to that of ammonium ions is between sodium and potassium ions, and it is expected that ammonia or amines would displace sodium ion during the service cycle by the potassium. Divalent ions such as calcium magnesium and iron displace sodium and potassium. It is to be noted that potassium would not be as readily displaced by ammonium or amine ion, if at all because of selectivity. Therefore, the use of potassium hydroxide or potassium chloride would serve as a single step and a less time consuming process in the applicable system for separate external regeneration or in-place regeneration.

THE INVENTION

I. In order to minimize the sodium leakage from mixed bed condensate polishing systems, improved separation of cation resin has been proposed as in Short, U.S. Pat. No. 3,826,761; other treatments of the regenerated anion portion that have been proposed include the use of ammonia (U.S. Pat. No. 3,385,787) and the use of calcium (U.S. Pat. No. 3,501,401) to displace sodium from any entrained cation resin.

These multi-step regenerations are expensive and time consuming, and evidence indicates some calcium leakage into the condensate system during the service cycle may take place when using regeneration techniques of this type.

Selectivity charts show potassium ion selectivity to fall between sodium and ammonium ion for sulphonic acid ion exchange resins, with the spread increasing with higher degree of crosslinking with divinylbenzene.

Thus, it would be expected that potassium would not be as readily displaced as sodium ion by ammonium ion and/or possibly some amines (such as morpholine) used in condensate treatment.

By using potassium hydroxide instead of sodium hydroxide any cation resin entrained in the anion layer would be converted to the potassium form.

This would simplify the overall regeneration and avoid any calcium ion leakage as in the other system mentioned above.

The foregoing applies to the utility type systems employing external regeneration which includes regeneration in separate vessels. However, there are an increasing number of installations of mixed bed condensate polishing systems, in the pressure range of 900–1500 psib., which use "in-place" regeneration. This aggravates the problem as the sodium hydroxide solution normally used to regenerate the anion resin tends to penetrate into a portion of the cation layer as there is no fine line of demarcation between resins but actually a band.

The use of potassium hydroxide over sodium hydroxide does not present any problems in application as the regeneration procedure would be identical. Any existing plants could be converted without equipment changes.

II. In sodium cycle condensate polishing, sodium chloride is generally used as the regenerant. If potassium chloride is used, then, the corresponding potassium salts of sulfite, bisulfite or hydrosulfite could be employed. Alternately, a reducing agent such as hydrazine could be used during the potassium chloride addition. In both cases above, in order to further improve the selectivity of the resins, higher cross linked materials are preferred. Generally, these resins are cross linked with divinylbenzene and as an example a material such as Dowex HGR, a commercially available resin from the Dow Chemical Company, would be desirable since it is approximately 10% cross linked.

The use of the corresponding potassium salt in place of a sodium salt now normally used would present no problems as far as equipment design or the like. In fact, the potassium salts could be used in the same form as the sodium salts are now used and operated at the same parameters and concentrations with correction for the molecular weight of the corresponding potassium salt.

It should be pointed out that while my invention is directed to the purification of boiler feed water, it is also applicable to the purification of boiler water condensate and such use is covered by the term, "boiler feed water."

In order to show the merits of the instant invention, the following examples are presented:

EXAMPLE I

Samples of a commercially available anion exchange resins would be obtained. This batch would be contaminated with approximately 1% by volume of a strong acid cation exchange resin. After mixing thoroughly to insure a homogeneous sample, the resin would be divided into two equal portions by volume and placed in similar columns, labeled 1 and 2. To one of the portions would be added a solution of 1.0 normal sodium hydroxide, while in sample 2 would be added an equivalent volume of 1.0 N potassium hydroxide. Both columns would then be rinsed with distilled water, so that no detectable sodium or potassium would be present in the effluent. A simulated condensate stream would then be passed through these columns. This simulated condensate would contain 500 parts per billion of ammonia such as that which would normally be encountered as a corrosion control additive or pH control additive in a utility boiler water system. Five hundred milliliters of condensate would be passed through each of the columns. The effluent from column 1 which would have been regenerated with sodium hydroxide would contain approximately 300 parts per billion sodium ion. In contrast, the effluent from column 2 which would have been treated with potassium hydroxide would contain less than 5 parts per billion potassium. No sodium would be found in the effluent from column 2.

EXAMPLE II

In order to show the merits of the instant invention in a typical cation condensate polishing system, several batches of a standard commercially available approximately 10% cross linked resin would be obtained. The resin would be intimately admixed and would then be divided into two columns of equal height and diameter. Each column would then be treated to convert the cation exchange resin to its corresponding ion form, and would be placed in the sodium and/or potassium. Column 1 would then be treated with 2.0 N sodium chloride while column 2 would be treated with 2.0 N potassium chloride. Both columns would then be fully rinsed with distilled water so that their effluent would contain no sodium, potassium or sodium ions.

A synthetic hard water containing sizeable amounts of iron, calcium and magnesium and doped with 200 parts per billion of ammonia but containing no sodium or potassium would be prepared. Five hundred milliliters of this water would then be passed through each column. The effluent from column 1 would be analyzed for sodium. Three hundred parts per billion of sodium would be found in this supply. The effluent from column 2 which would have been regenerated using potassium chloride would than be analyzed. The effluent in this case would contain only 4 parts per billion of potassium.

As seen with the use of this invention, sodium leakage in waters can be greatly reduced, thus, in turn, also limiting the sodium carryover in the stream produced when this water is used as boiler feed. While concentrations of the potassium salts used have not been detailed above, they will be readily apparent to those skilled in the art based on the use of corresponding sodium salts in conventional ion exchange procedures. Likewise, the temperatures and the like employed for regeneration will also be known to those familiar with ion exchange procedures currently being utilized.

I claim:

1. In the regeneration of mixed bed ion exchange resin systems used for the purification of boiler feed water, which regeneration generally consists of separating the cation exchange resin from the anion exchange resin and regenerating said separating resins, the improvement consisting essentially of regenerating the anion exchange resin containing entrained cation exchange resin with an aqueous solution of potassium hydroxide.

2. The improvement of claim 1 wherein regeneration of the anion exchange resin is accomplished in place.

3. The improvement of claim 1 wherein regeneration of the anion exchange resin is accomplished in an external regeneration vessel.

4. In the regeneration of a cation exchange resin utilized to purify boiler feed water, which regeneration is normally carried out in place and consists of backwash with high pressure, high temperature condensate followed by brine regeneration with approximately 15 pounds of sodium chloride per cubic foot of resin, the improvement consisting essentially of utilizing potassium chloride in place of sodium chloride whereby sodium leakage is greatly reduced.

5. The improvement of claim 4 where in addition to the replacement of sodium chloride with potassium chloride at least one reducing agent from the group consisting of potassium hydrosulfite, potassium bisulfite, and potassium sulfite is utilized to minimize or reduce ferric ion formation.

6. The improvement of claim 4 wherein the cation exchange resin is regenerated in place.

7. The improvement of claim 4 wherein the cation exchange resin is regenerated in a separate external regeneration vessel.

* * * * *

UNITED STATES PATENT OFFICE
CERTIFICATE OF CORRECTION

Patent No. 4,151,079          Dated APRIL 24, 1979

Inventor(s) LOUIS EDWARD HOREMBALA

It is certified that error appears in the above-identified patent and that said Letters Patent are hereby corrected as shown below:

NAME OF ASSIGNEE:     NALCO CHEMICAL COMPANY

OAK BROOK, ILLINOIS

LETTERS PATENT SHOULD READ AS:

NAME OF ASSIGNEE:     ALCHEM, INC.

BURLINGTON, ONTARIO, CANADA

Signed and Sealed this

Fourteenth Day of August 1979

[SEAL]

Attest:

LUTRELLE F. PARKER
*Attesting Officer*     *Acting Commissioner of Patents and Trademarks*